May 22, 1956  C. M. BREHM  2,746,544
DIE ASSEMBLY IN APPARATUS FOR TRIMMING TUBULAR PIECES
Filed Jan. 27, 1953  5 Sheets-Sheet 1
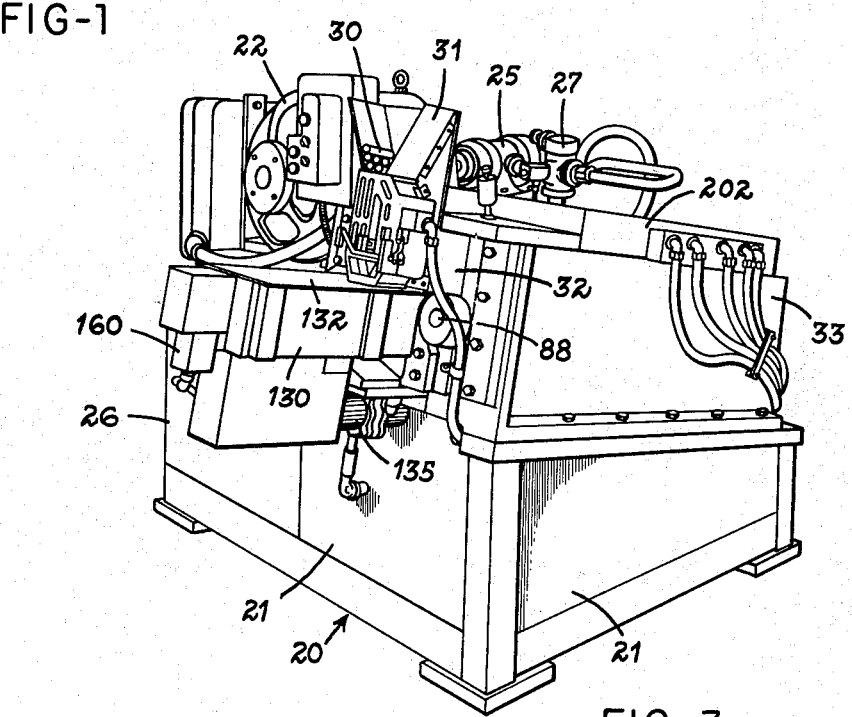
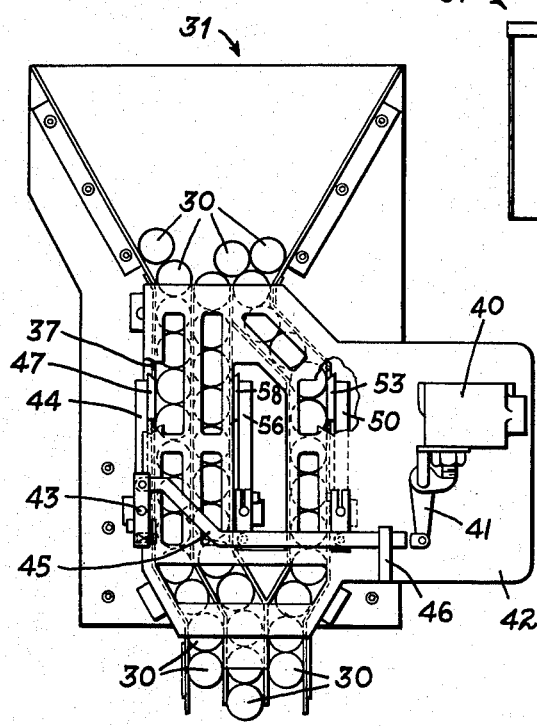
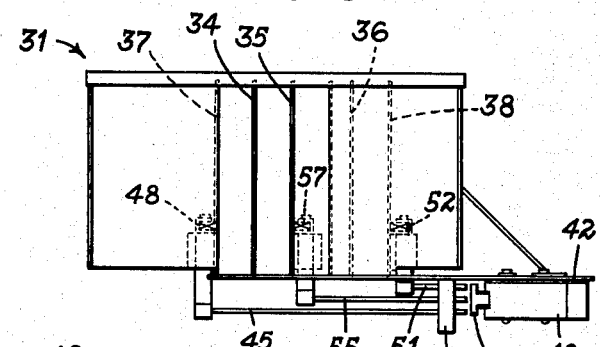
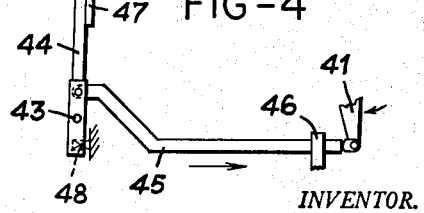
INVENTOR.
CHARLES M. BREHM
BY
ATTORNEYS

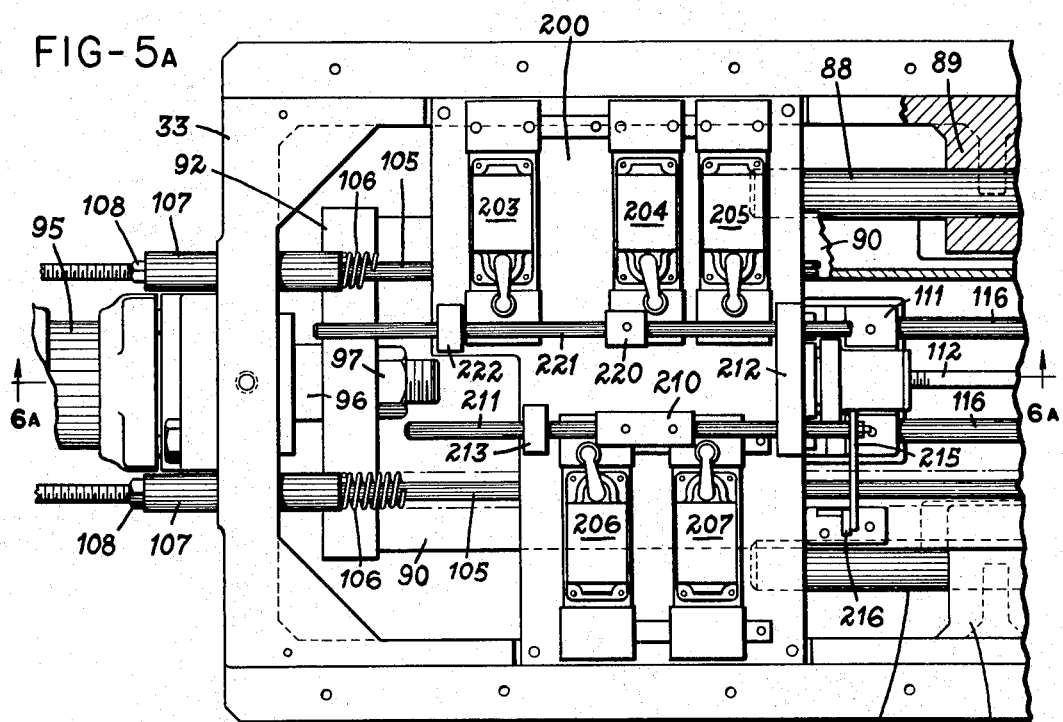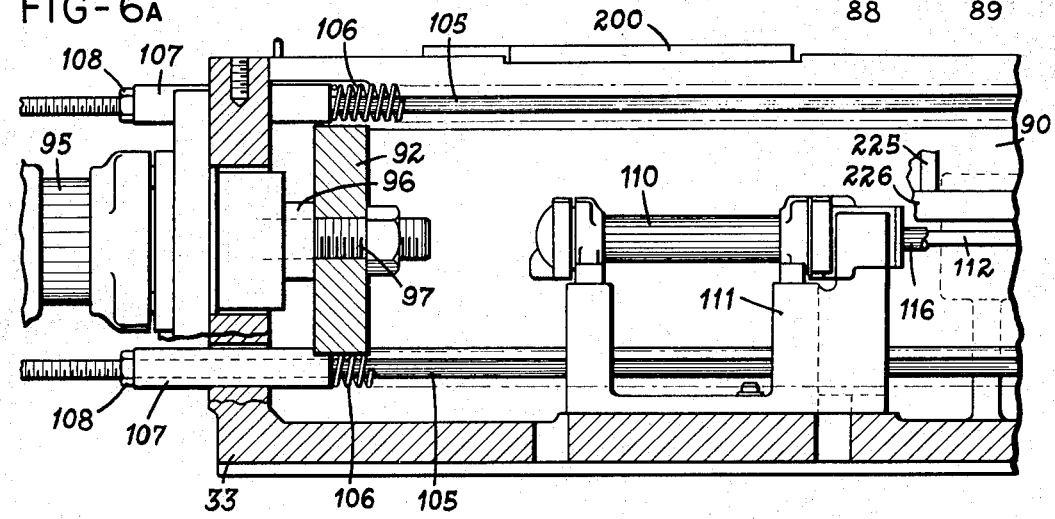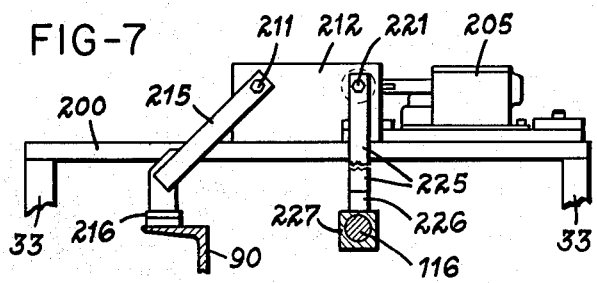

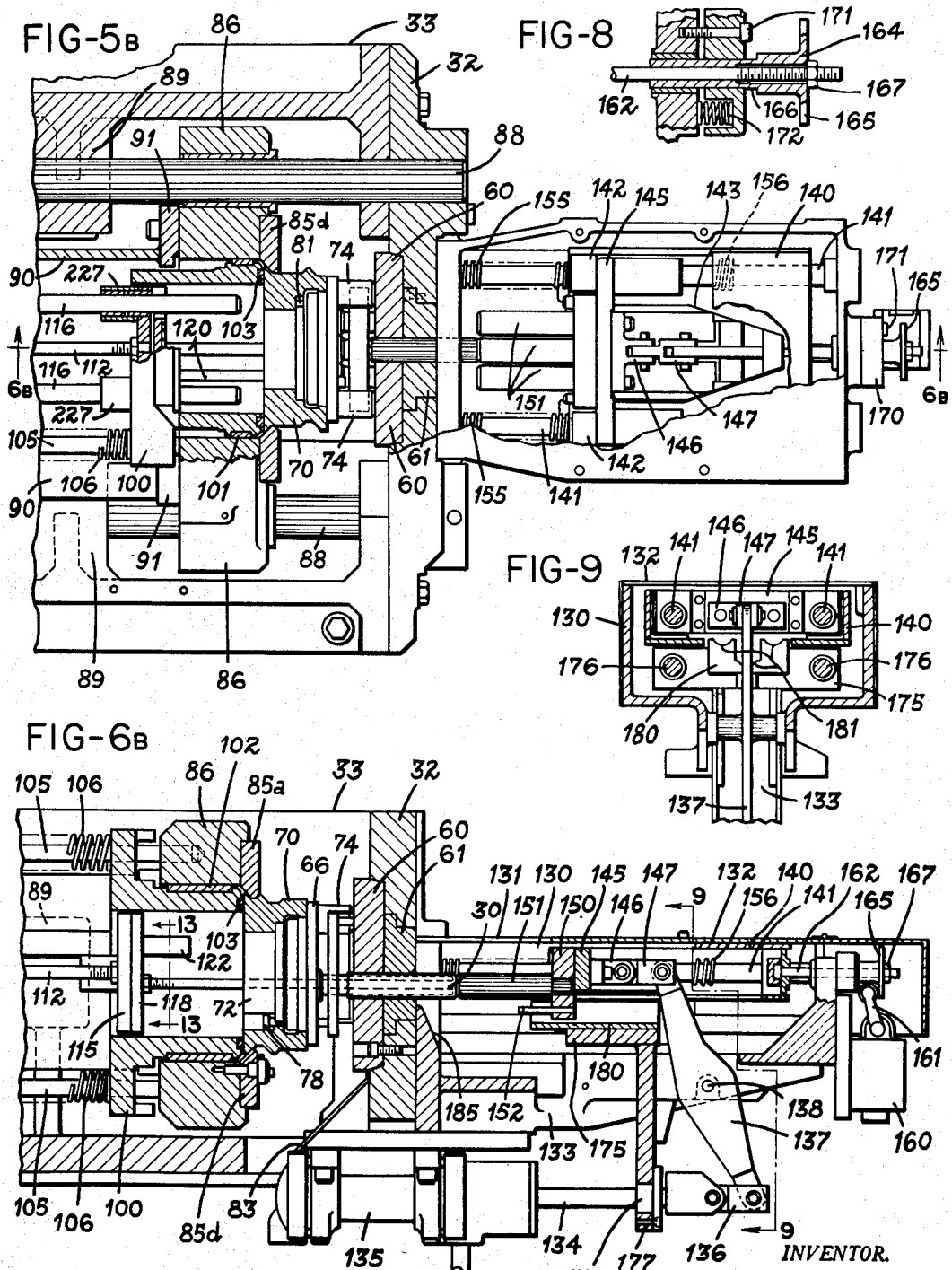

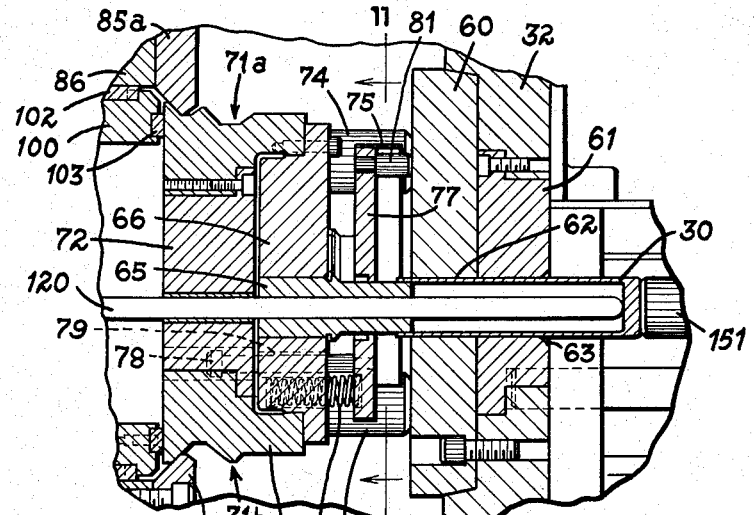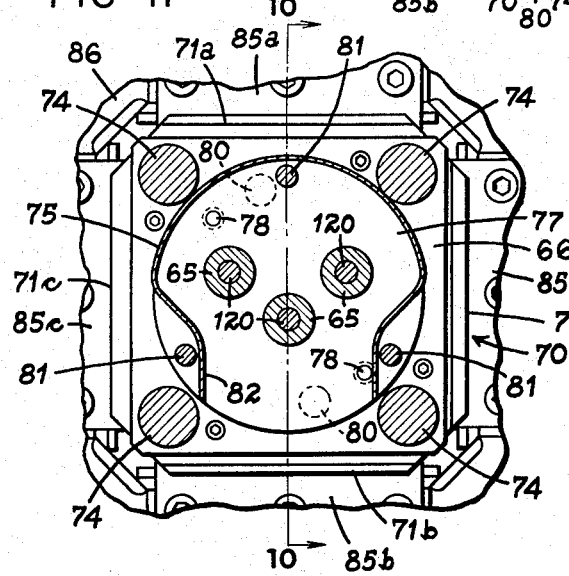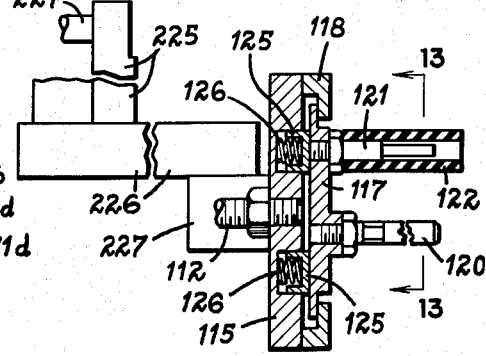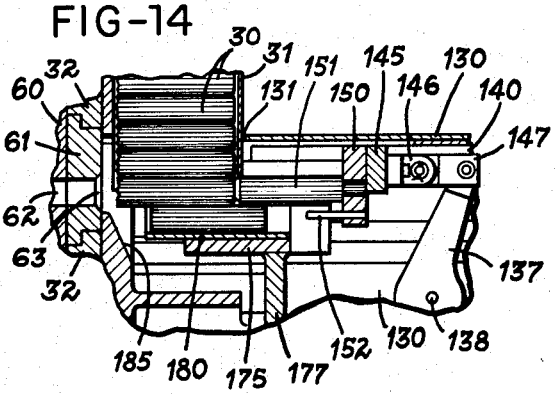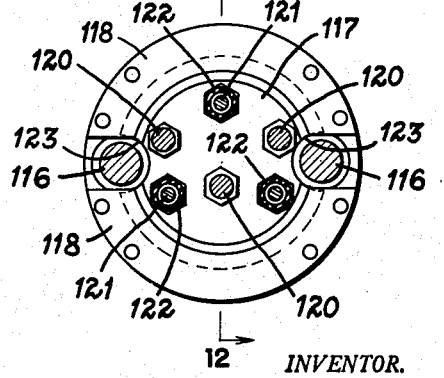

May 22, 1956          C. M. BREHM          2,746,544

DIE ASSEMBLY IN APPARATUS FOR TRIMMING TUBULAR PIECES

Filed Jan. 27, 1953          5 Sheets-Sheet 5

*INVENTOR.*
CHARLES M. BREHM
BY
ATTORNEYS

United States Patent Office 2,746,544
Patented May 22, 1956

2,746,544

DIE ASSEMBLY IN APPARATUS FOR TRIMMING TUBULAR PIECES

Charles M. Brehm, Springfield, Ohio, assignor, by mesne assignments, to Kelsey-Hayes Wheel Company, Detroit, Mich., a corporation of Delaware Application January 27, 1953, Serial No. 333,499

16 Claims. (Cl. 164—48)

This invention relates to apparatus for trimming tubular pieces, and more particularly to a trimming die assembly of the type wherein a die member receives therein the part to be trimmed with the portion to be cut off projecting out of the die, and a complementary punch member is inserted within this projecting portion of the piece and is caused to move transversely with respect to the die and thus to shear off the desired scrap from the piece.

The invention has special relation to trimming apparatus of the above general type which is adapted to trim a plurality of tubular pieces at the same time and at a sufficiently rapid rate for use in the high speed production of multiple small pieces. For example, the invention is applicable for apparatus for trimming pieces such as cartridge shells formed from sheet stock and which by reason of their one-time use and disposal are preferably produced at minimum unit cost and maximum speed while also requiring a high standard of uniformity. A primary objective of the present invention is to provide automatic trimming apparatus capable of use for such trimming operations.

Among other major objects of the invention is the provision of automatic trimming apparatus of the above general type in which multiple tubular pieces are automatically fed into position for trimming and are similarly ejected after trimming with the entire operation taking place at adequately high speed to assure a rapid overall production rate.

An additional object of the invention is to provide automatic trimming apparatus of the above general type in which the pieces to be trimmed are loaded into operative position by a movable feeding member which also cooperates with an ejecting member to serve as a gauge assuring proper positioning of the piece for trimming to an accurately predetermined length.

It is also an object of the invention to provide automatic trimming apparatus of the above general type which is readily adapted to the trimming of pieces of different sizes and desired final lengths by simple interchange of a minimum number of parts and corresponding adjustment of the working movements of the other parts.

Other objects and advantages of the invention will be apparent from the following description, the accompanying drawings and the appended claims.

In the drawings—

Fig. 1 is a perspective view showing automatic trimming apparatus constructed in accordance with the invention for trimming steel cartridge shells;

Fig. 2 is a detail view looking generally from left to right in Fig. 1 and showing the hopper for supplying the shells to the trimming mechanism, the view being partly in side elevation and partly broken away;

Fig. 3 is a plan view of the parts shown in Fig. 2;

Fig. 4 is a diagrammatic view illustrating a moved position of certain of the parts shown in Figs. 2 and 3;

Figure 15:
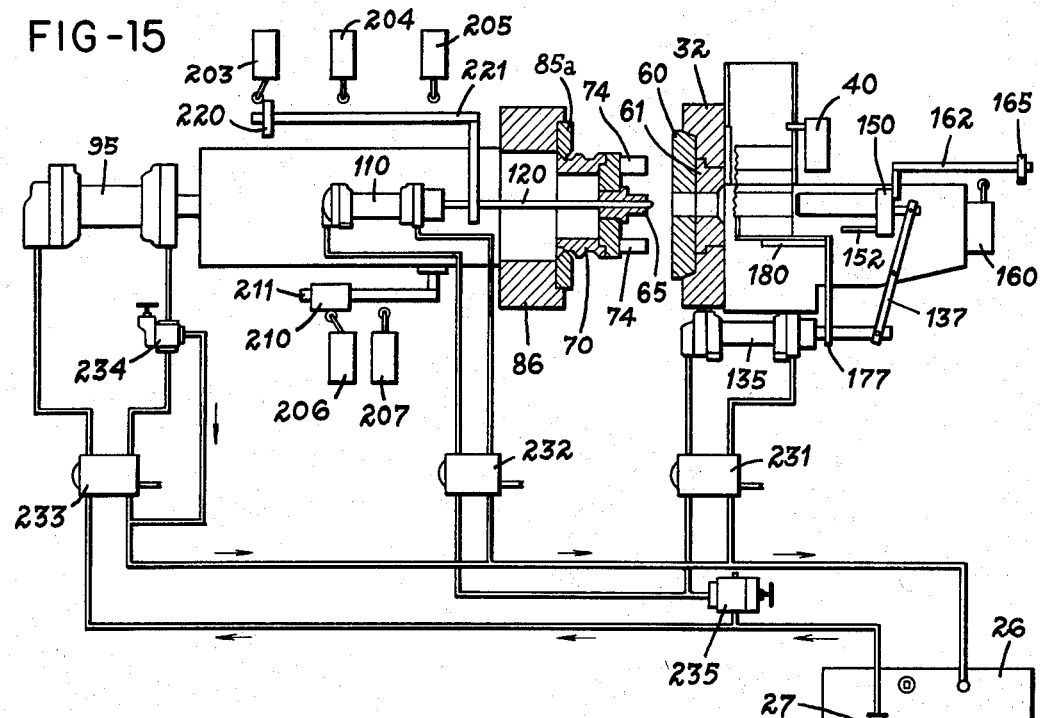
Figure 16:
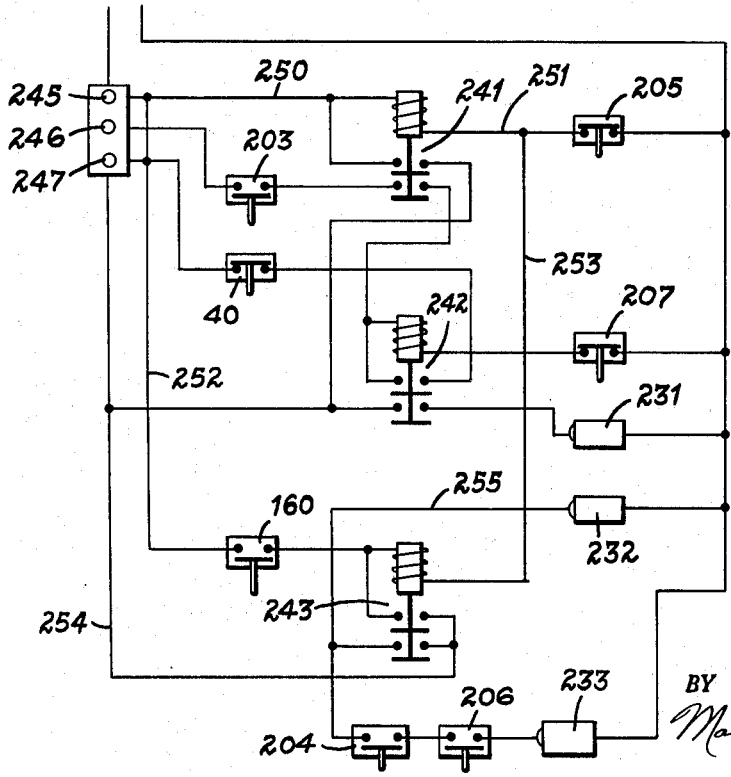

Figs. 5a and 5b together constitute a plan view, partly broken away and in section, of the major operating mechanism in the apparatus of Fig. 1;

Figs. 6a and 6b are views in vertical section generally on the lines 6a—6a and 6b—6b of Figs. 5a and 5b respectively;

Fig. 7 is a fragmentary view looking from right to left in Fig. 5a and showing certain of the limit switches and their operating parts;

Fig. 8 is an enlarged view looking downwardly in Fig. 5b and broken away in section;

Fig. 9 is a fragmentary section on the line 9—9 of Fig. 6b;

Fig. 10 is an enlarged fragment of Fig. 6b taken approximately on the line 10—10 of Fig. 11;

Fig. 11 is a section on the line 11—11 of Fig. 10;

Fig. 12 is an enlarged fragmentary section on the line 12—12 of Fig. 13;

Fig. 13 is a section on the line 13—13 of Fig. 12 and also of Fig. 6b;

Fig. 14 is a fragment of Fig. 6b illustrating a moved position of the feeding mechanism;

Fig. 15 is a schematic view showing the hydraulic operating system for the apparatus of Fig. 1; and Fig. 16 is a wiring diagram.

Referring to the drawings, which illustrate a preferred embodiment of the invention, Fig. 1 shows a complete trimming apparatus including a base 20 within which may readily be mounted some of the operating equipment for the apparatus and which may be provided with protective side panels 21. The operating parts of this apparatus are hydraulically actuated, and the drive motor 22 of the unit is mounted on top of base 20 and drives a pump 25 for circulating hydraulic fluid from the reservoir 26 mounted in the lower portion of the base. Fig. 1 also shows a relief valve 27 which regulates the output of pump 25 and has a return connection to the reservoir.

The cartridge shells 30 or other pieces to be trimmed are initially supplied to the apparatus by a hopper 31 bolted to the back of the end plate 32 of the main housing 33. This apparatus is shown as designed to trim three pieces at the same time, and hopper 31 is accordingly formed to supply three separate columns of shells to the trimming station. Referring to Figs. 2 and 3, inner partitions 34, 35 and 36 cooperate with the outer walls 37 and 38 of the hopper to form three chutes through which the shells move by gravity to the trimming station, and the other parts of the feeding mechanism cooperate to align each successive shell in the proper position at the trimming station as described hereinafter.

A limit switch 40 having an operating arm 41 is mounted on the front plate 42 of hopper 31 and cooperates with an operating member on the hopper to prevent operation of the apparatus if all three chutes are not filled with shells. For example, the left hand chute as viewed in Fig. 2 is provided with an arm 44 pivoted at 43 on the wall 37, and a second arm 45 is pivoted to arm 44 and extends slidably through a guide bracket 46 on plate 42 into close proximity with the switch arm 41. The upper end of arm 44 includes a cam 47 adapted to extend through a slot in the wall 37, and a spring 48 biases this arm in clockwise direction as viewed in Fig. 2 to cause its cam 47 to enter the chute. When the chute is full of shells, they engage cam 47 and thus push arm 44 to the vertical position as shown in Fig. 2, but if the level of shells in the chute drops below cam 47, arm 44 will move to the inclined position shown in Fig. 4 and thus cause arm 45 to engage and operate switch arm 41.

The right hand and middle chutes are provided with similar arm arrangements for operating switch 40. Thus a pair of arms 50 and 51 for the right hand chute is provided with a spring 52 and cam 53 extending through a slot in the wall 38. The middle chute has a pair of arms 55 and 56, a spring 57 and a cam 58 extending through a slot in the partition 35, and it will be noted that the two partitions 35 and 36 are provided in order to form a chamber for mounting the arm 55. The switch 40 is normally closed and is connected in the control circuits of the apparatus to prevent operation of the trimming mechanism when this switch is opened, as described hereinafter in connection with the wiring diagram, and thus since each of these arm units is capable of operating switch arm 41 independently of the others, there is positive assurance that the apparatus will operate only when all three chutes are full of shells.

The main housing 33 and its end plate 32 support and enclose the punch and die assembly and their operating mechanisms. Referring particularly to Figs. 5b, 6b and 9, the die 60 is bolted to the inner face of plate 32 and cooperates with an adapter 61 similarly bolted to plate 32 in position to receive the successive shells from the bottom of the hopper 31. With the apparatus designed as stated for simultaneously trimming three pieces, die 60 is provided with three through bores 62 proportioned to receive the shells therein in close sliding relation, and adapter 61 has three similar bores each provided with a slightly flared outer end 63 for guiding the entering ends of the shells.

The die 60 cooperates with three complementary punch members 65 of tubular construction carried by an adapter 66 which is in turn bolted to the generally square cam block 70 having cam surfaces 71a—71d on four major sides. The central portion of cam block 70 is provided with a large diameter through bore within which is bolted an adapter 72. The end surfaces of punch 65 are aligned with the front surface of die 60 to define the plane in which the shells 30 are trimmed, and this relationship of these parts is maintained by a plurality of pressure pins 74 carried by adapter 66 and bearing on the front surface of die 60. As shown in Fig. 10, the punches 65 are arranged with the center punch spaced below the other two punches, and it will be understood that the bores 62 in die 60 are correspondingly arranged.

This cutting area is provided with a protective shroud 75 welded on a plate 77 carried by bolts 78 mounted for sliding movement in bushings 79 press fitted in through bores in adapter 66. Springs 80 carried by adapter 66 urge plate 77 towards the die, and pins 81 extend from plate 77 and ride on the front surface of the die to maintain shroud 75 spaced from frictional contact with the die. As shown in Fig. 11, shroud 75 is open only on its bottom side to form a chute 82 through which the trimmed scrap is discharged by gravity, and a deflector 83 (Fig. 6b) directs this scrap to the floor or a suitable receptacle.

The cam block is supported for lateral and vertical transverse movement with respect to the die 60 but is continually urged toward the die to maintain the pressure pins 74 in contact with the die for proper alignment of the punch and die. Referring particularly to Figs. 5b and 6b, this movement of the cam block 70 is effected and controlled by four cams 85a—85d bolted on the front face of a crosshead 86 mounted by bushings for sliding movement on a pair of guide rods 88 seated in the end plate 32 and in a pair of bosses 89 within housing 33. The crosshead 86 is also bolted to one end of a pair of channels 90 having plates 91 welded thereto for convenience of attachment to the crosshead. The opposite ends of the channels 90 are similarly welded to a plate 92, and thus the channels cooperate with the parts 86 and 92 to form a ram movable horizontally on guide rods 88. Such movements of this ram are in turn effected and controlled by a hydraulic cylinder 95 mounted on the end wall of housing 33 and having its piston rod 96 connected to the plate 92 at 97.

An additional crosshead 100 is mounted for relative sliding movement within crosshead 86 by means of bearings 101 and 102, and a thrust bearing 103 on the end face of crosshead 100 engages the adjacent end of cam block 70. The crosshead 100 is mounted for relative sliding movement on a plurality of rods 105 threaded at their inner ends into crosshead 86 and each carrying a compression spring 106. The outer end of each rod 105 carries a sleeve 107 slidable in a bore in the end wall of housing 33, and a nut 108 is threaded on the outer end of each rod 105 for cooperation with the associated sleeve 107 to adjust the tension of the associated spring 106.

In the operating stroke of the ram, cams 85 cooperate with the cam surfaces 71 on the cam block to cause successive vertical and lateral transverse movements of the cam block and corresponding movement of the punches 65, this sequence of movements being generally as described, for example, in Brehm Patent No. 2,347,808 issued May 2, 1944, to the same assignee as this application. During these movements, the cam block is maintained in proper alignment with the die by the pressure of springs 106 acting through crosshead 100 to maintain all of the pressure pins 74 in contact with the die. It will also be noted that since rods 105 move with the crosshead 86 on the working stroke of the ram, this force of the springs 106 will progressively increase as the trimming operation proceeds in order to assure against undesired cocking of the punches.

The housing 33 also supports the ejecting mechanism for the trimmed shells or other pieces. This ejecting mechanism includes a hydraulic cylinder 110 mounted on a bracket 111 bolted to the bottom of housing 33 between the channels 90. The piston rod 112 of cylinder 110 is connected to a small crosshead 115 mounted for sliding movement on a pair of guide rods 116 supported in cantilevered fashion from the bracket 111. A plate 117 is in turn mounted on crosshead 115 by means of a split retainer 118, and this plate 117 carries three ejector rods 120 which extend freely through the punches 65 to engage and eject pieces from die 60. The plate 117 also carries three relatively short studs 121 each fitted with a sleeve 122 of rubber or like material to serve as a bumper against adapter 72 at the completion of the stroke of the ejecting mechanism.

Since the ejector rods 120 extend through the punches and preferably move radially therewith, the connection between the plate 117 and the crosshead 115 allows for similar relative lateral movement. As shown in Fig. 12, the retainer 118 includes a flange portion overhanging plate 117 with sufficient axial and radial clearance to allow both radial and axial movement of plate 117, and the sides of plate 117 are cut away at 123 for similar clearance with respect to guide rods 116. In addition, cups 125 are slidably mounted in receiving bores in the face of crosshead 115 and are provided with springs 126 normally urging the parts 115 and 117 apart with sufficient force to retain them in essentially parallel relation.

The loading or feeding mechanism for the apparatus is supported in a housing 130 which is bolted to the end plate 32. An opening 131 in the cover 132 of housing 130 receives the lower end of the hopper 31, and an opening 133 in the underside of the housing provides for discharge of the trimmed shells. Within housing 130 is a pair of carriage units mounted for conjoint reciprocating movement in opposite directions controlled by a hydraulic cylinder 135 mounted on the underside of the housing and having its piston rod 134 connected by a clevis 136 to a lever 137 pivoted to the housing at 138. These two carriage units operate respectively to feed into the die 60 the shells to be trimmed and to receive from the die the trimmed shells for discharge.

The feeding carriage unit includes a tray-like member 140 mounted for sliding movement on a pair of guide rods 141 in housing 130, the tray 140 including bosses 142 at its forward end and being cut away at 143 to receive the lever 137 therethrough. A crosshead 145 is also mounted on rods 141 between bosses 142 and the back of carriage 140, and crosshead 145 is connected to lever 137 by means of a forked bracket 146 and clevis 147. A plate 150 is bolted to the front of crosshead 145 between bosses 142 and carries three feed rods 151, which are of substantially the same diameter as the shells 30 and are aligned with the three bores in the die 60 and adapter 61. The plate 150 also carries three stripper pins 152 each located below one of the feed rods 151 and spaced below the center of the feed rod by a distance approximately equal to the diameter of shell 30. The plate 150 and the feed rods 151 and pins 152 accordingly reciprocate with the crosshead 145. Springs 155 on rods 141 serve as bumpers to cushion and help stop the forward movement of this entire carriage unit towards the back or outer end of housing 130, and additional springs 156 on rods 141 act as cushions between crosshead 145 and the back of tray 140 on the retracting stroke of the crosshead.

Means are provided for establishing an accurately controlled advanced limit position for the feed rods 151 and for coordinating arrival of the feed rods at this limit position with the operative cycle of the apparatus. For this purpose, a limit switch 160 is mounted at the back end of housing 130, and its switch arm 161 is operated by a rod 162 extending rearwardly from tray 140 through the back end of the housing. This rod 162 has threaded thereon a sleeve 164 formed with a flange 165 at its outer end and a shoulder 166 spaced forwardly from the flange 165. The sleeve 164 is slidable through the end of housing 130 and a lock nut 167 holds this sleeve in adjusted position on rod 162.

The forward movement of this feeding unit is limited by engagement between the shoulder 166 on sleeve 164 and a plate 170 mounted on the back end of housing 130. This engagement is cushioned by mounting plate 170 for limited sliding movement on a pair of bolts 171 against a pair of cushioning springs 172, as shown in detail in Fig. 8. These parts therefore cooperate with the remainder of the feeding carriage unit as described to establish the advanced limit position of the feed rods 151, and since these feed rods push the successive shells into the die 60, they also act as the gauge members for establishing the extent to which the shells project beyond die 60 for trimming. The trimmed length for each shell is thus accurately established as the distance between the front face of the die and the forward end of the feed rods 151, and this length can be adjusted as desired by shifting the position of sleeve 164 on rod 162. In addition, the ejector rods 120 operate during the trimming strokes of the punches to push the shells firmly against feed rods 151 to assure trimming to this desired accurate length, as described hereinafter in connection with the wiring diagram.

The carriage unit for receiving the trimmed shells includes a crosshead 175 mounted for sliding movement on a pair of rods 176 below rods 141, and the crosshead 175 includes a downwardly extending arm 177 secured to the piston rod 134 by a collared nut 178. The crosshead 175 carries a tray 180 having its upper surface formed to provide three grooved portions 181 for receiving thereon the trimmed cartridges discharged from the die 60. These individual tray portions 181 are each directly spaced below one of the feed rods 151 by a distance substantially equal to the diameter of one of the shells 30, and the stripper pins 152 thus lie midway between their associated feed rods 151 and tray portions 181.

The crosshead 175 and its associated parts forming the cartridge discharging carriage accordingly advance as the feeding carriage retracts and vice versa, and in operation when a set of trimmed shells is ejected from the die by the ejector rods 120, they drop onto the advancing tray portions 181, this action being facilitated by the tapered throat 185 in housing 130 just below the bores 63. Since at the same time, the feed rods 151 retract out of the chutes at the bottom of the hopper, the shells in the hopper are free to drop on top of the trimmed shells in the trays 181. These trimmed shells therefore support the next set of shells to be trimmed in aligned relation with the die bores for loading therein when the feed rods 151 next advance, as is illustrated in Figs. 2 and 14. Similarly when the feed rods advance, the stripper pins 152 advance with them, and since the crosshead 175 simultaneously retracts, the pins 152 push the trimmed shells off the front ends of the trays 181 so that these trimmed shells can drop out through the opening 133. This action is repeated for each cycle of the apparatus.

In addition to the limit switches already noted, there are five other limit switches which cooperate in controlling the operating cycle of the apparatus and are shown as mounted in two rows on a plate 200 bolted on the top of main housing 33 and provided with a cover 202 (Fig. 1). Three of these switches 203, 204 and 205 are arranged in one row for operation by the ejecting mechanism, and the other pair of switches 206 and 207 are operated by movement of the ram. The switches 206 and 207 are arranged with their switch arms positioned for operation by a collar 210 on a rod 211 slidable in blocks 212 and 213 on top of plate 200 and connected at one end to an arm 215 extending upwardly from a bracket 216 on top of one of the channels 90. The switches 203, 204 and 205 are similarly arranged for operation by a collar 220 on a rod 221 slidable in block 212 and a similar block 222, and one end of rod 221 is connected to an arm 225 projecting upwardly from a bracket structure 226 welded on one of the bosses 227 on the crosshead 115.

The hydraulic and wiring diagrams in Figs. 15 and 16 illustrate the operative relationship of these switches and the remainder of the apparatus. The hydraulic circuits include three four-way solenoid operated valves of the spring return type. The valve 231 controls the loading cylinder 135, the valve 232 similarly controls the ejecting cylinder 110, and the valve 233 controls the main operating cylinder 95. These cylinders are of different effective areas to provide different desired operating effects, satisfactory results having been obtained with valve 95 having a 4-inch bore and 4-inch stroke, valve 110 having a 1-inch bore and 8-inch stroke and valve 135 having a 1 9/16-inch bore and 4½-inch stroke. The cylinder 95 is connected to receive full line pressure on its working end, but on the return side the line is shown as provided with a relief valve 234. The cylinders 110 and 135 are both supplied with pressure through a reducing valve 235.

The electric circuit for the apparatus includes three control relays 241, 242 and 243, and it also includes three control switch buttons, a button 245 connected for manually controlled single cycle operation of the apparatus, a safety stop button 246, and a button 247 for starting automatic operation of the apparatus. For convenience of explanation, it may be assumed that the apparatus is initially in the condition represented in Fig. 15, namely with all three cylinders in retracted position in readiness for loading the next set of shells into the die. At this point in the cycle, the several limit switches are in the positions shown in Fig. 16 with the exception of the normally open switch 203, which is held closed by collar 220, and normally open switch 206 which is held closed by collar 210.

Assuming that switch button 247 has been actuated to cause automatic operation, relay 241 will be energized through the lines 250 and 251 and limit switch 205. Both sets of contacts of this relay are accordingly closed, and since switch 203 is being held closed, relay 242 will similarly be energized through the lower pair of contacts of relay 241 and limit switch 207. This also completes a holding circuit for relay 242 through its upper pair of contacts and the limit switches 40 and 207.

Under these conditions, valve 231 will be energized in the direction to supply pressure to cylinder 135, and this in turn will cause lever 137 to rock in counterclockwise direction as viewed in Fig. 15 and thus to advance the feeding carriage and feed rods 151, causing the new shells to be loaded into the die. When the feeding carriage reaches its advanced limit position as described, the flange 165 on rod 162 will close switch 160, and this will complete the energizing circuit for relay 243 through lines 252 and 253 and limit switch 205. The resulting closing of both sets of contacts of relay 243 completes a holding circuit for this relay through its upper set of contacts and the lines 253 and 254, and it also completes the energizing circuit for valve 232 through the bottom contacts of relay 243 and the line 255. The valve 233, however, remains deenergized due to the fact that switch 204 is still open.

Thus as soon as the feeding action has been completed pressure is supplied to the ejecting cylinder 110 to cause the ejector rods 120 to advance and thus to hold the shells firmly against the feed rods. This action, however, does not otherwise affect the positions of the shells owing to the fact that the cylinder 135 is of greater effective area than cylinder 110. It will also be noted that as soon as the ejecting mechanism advances, collar 220 moves away from switch 203 and permits this switch to open, thereby interrupting the original energizing circuit for relay 242, but this relay remains energized through its holding circuit as described. On the other hand, if the level of the shells in any of the chutes of hopper 31 is too low, switch 40 will open as previously described, and since this will interrupt the holding circuit for relay 242, further operation of the apparatus will be prevented until this condition is corrected.

As the ejecting mechanism continues to advance, the collar 220 engages and closes the switch 204, these parts being initially in such relative position that this action takes place when the ejector rods complete the first section of their advancing movement by bottoming in the shells to be trimmed. Closing of switch 204 in turn completes the energizing circuit for valve 233 through switch 206 to cause pressure to be supplied to the high pressure end of the main cylinder 95, and the ram accordingly executes its working stroke. During this stroke, the several cams 85 cooperate with the cam surfaces 71 on cam block 70 to cause the punches 65 to move transversely in four successive directions, and with the parts as shown, these movements will be respectively down, up, to the left and finally to the right.

It will be noted in Fig. 5a that collar 210 is of considerable length, and it is proportioned in accordance with the spacing of switches 206 and 207 to hold switch 206 closed during substantially the entire stroke of the ram and then to release this switch just as it engages and opens switch 207. Opening of switch 206 interrupts the energizing circuit for valve 233 and thus shifts the valve to the position causing retraction of the ram. Simultaneously, opening of switch 207 interrupts the energizing circuit for relay 242 and causes this relay to open, thereby deenergizing valve 231 so that the loading cylinder 135 is caused to retract. As soon as the feeding carriage begins to retract, switch 160 is opened, but relay 243 remains closed through its holding circuit and thereby retains valve 232 in energized position to cause ejector rods 120 to execute the second portion of their stroke, in which they eject the trimmed shells from the back of the die as described.

This continued movement of the ejecting mechanism first causes switch 204 to open, but this produces no further action since switch 206 has already opened. Then upon completion of the stroke of the ejecting mechanism, the collar 220 engages and opens switch 205 and thus interrupts the holding circuit for relay 243. This in turn deenergizes valve 232 to cause retraction of the ejecting mechanism, and all of the parts therefore return to their starting positions. However, since switch 205 recloses as soon as the ejecting mechanism begins to retract, relay 241 is again energized in readiness for the next cycle, which is initiated as described upon completion of the retracting stroke of the ejecting mechanism by the action of collar 220 in again closing switch 203 to cause reenergizing of relay 242.

The operation of this apparatus is therefore entirely automatic, with three shells being trimmed and discharged on each complete cycle, and the several sections of the apparatus cooperate to assure accurately precise operation and to prevent operation in the event of improper conditions at any location. Thus as noted, unless the hopper is properly filled with shells, no action occurs, and after each cycle does begin, each successive stage thereof takes place only when the preceding stage has been properly completed. At the same time, the apparatus is capable of operating at a rapid rate successful results having been obtained, for example, in the trimming of 20 mm. cartridge shells at the rate of 40 cycles per minute and hence at a production rate of 7200 shells per hour. It will also be apparent that if it is desired to operate more slowly, the switch 247 may be opened and each successive cycle then started by means of the pushbutton switch 245.

Another desirable and important feature of this invention is the ease with which the apparatus can be adjusted for different trimming operations. For example, in the forming of cartridge shells from sheet or plate stock, it has been found desirable to perform separate trimming operations at different stages of production, and the shell blanks will be of different diameters at each such stage. The apparatus of the invention is easily changed for each such successive trimming operation by simple substitution of a different die 60 and punches 65 of the proper dimensions to accommodate shell blanks of the particular size to be trimmed. Similar modification of the die and punches can be effected to adapt the apparatus for the trimming of other pieces.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus of the character described for trimming tubular pieces comprising a die having a through bore for receiving successive said pieces therein for trimming, a feeding member mounted for reciprocating movement at the back of said die to feed said successive pieces into said bore, means for periodically holding said feeding member stationary in the advanced limit position thereof, a punch located at the front end of said die for insertion in the end of each said piece to be trimmed, drive means for effecting relative transverse movement of said punch and said die to trim said piece, a pusher member for engaging the opposite side of each said piece from said feeding member, and means for applying yielding pressure to said pusher member during operation of said drive means to urge each said piece against said stationary feeding member in such manner as to maintain the position of said piece in said die with respect to said feeding member during trimming thereof.

2. Apparatus of the character described for trimming tubular pieces comprising a die having a through bore for receiving successive said pieces therein for trimming, a feeding member mounted for reciprocating movement at the back of said die to feed said successive pieces into said bore, means for periodically holding said feeding member stationary in the advanced limit position thereof, a punch located at the front end of said die for insertion in the end of each said piece to be trimmed, a pusher member extending through said punch for engaging the opposite side of each said piece from said feeding member, means for applying yielding pressure to said pusher member to hold each said piece against said stationary feeding member to maintain the position of said piece in said die with respect to said feeding member, means for effecting relative transverse movement of said punch and said die to trim said piece, and means operable following said trimming movement for retracting said feeding member while continuing said application of pressure to said pusher member to eject the trimmed piece from said die.

3. Apparatus of the character described for trimming tubular pieces comprising a die having a through bore for receiving successive said pieces therein for trimming, a feeding member mounted for reciprocating movement at the back of said die to feed said successive pieces into said bore, a stop establishing an advanced limit position of said feeding member, means for periodically holding said feeding member stationary in said limit position, a punch located at the front end of said die for insertion in the end of each said piece to be trimmed, drive means for effecting relative transverse movement of said punch and said die to trim said piece, means for adjusting said stop to vary said limit position of said feeding member in accordance with the desired trimmed length of said pieces, a pusher member for engaging the opposite side of each said piece from said feeding member, and means for applying yielding pressure to said pusher member during operation of said drive means to urge each said piece against said feeding member in all stationary limit positions thereof established by adjustment of said stop to maintain the position of said piece in said die with respect to said adjusted stationary position of said feeding member.

4. Apparatus of the character described for trimming tubular pieces comprising a die having a through bore for receiving successive said pieces therein for trimming, a punch supported at the front end of said die for insertion in the end of each said piece to be trimmed, a feed rod mounted for reciprocating movement at the back of said die to feed said successive pieces into said bore, means establishing an advanced limit position for said feed rod, an ejector rod adapted to extend through said punch into each said piece, fluid pressure means urging said ejector rod toward said feed rod to hold said piece in fixed relation with said feed rod and said die, drive means for effecting relative transverse movement of said punch and said die to trim said piece, and means for retracting said feed rod while continuing operation of said fluid pressure means to cause said ejector rod to advance by said operation of said fluid pressure means and to eject the trimmed piece from said die.

5. Apparatus of the character described for trimming tubular pieces comprising a die having a through bore for receiving successive said pieces therein for trimming, a punch supported at the front end of said die for insertion in the end of each said piece to be trimmed, a feeding member mounted for reciprocating movement at the back of said die to feed said successive pieces into said bore, drive means for effecting relative transverse movement of said punch and said die to trim said piece, fluid pressure means for periodically reciprocating said feeding member in timed relation with said drive means to hold said feeding member stationary in the advanced limit position thereof during operation of said drive means, additional fluid pressure means for urging each said piece against said feeding member during operation of said drive means to maintain the position of said piece in said die with respect to said feeding member, the first named said fluid pressure means being of greater effective area than said additional fluid pressure means to hold said piece stationary during application of pressure to both said fluid pressure means, and means for retracting said feeding member while continuing the application of pressure to said additional fluid pressure means to eject each trimmed piece from said die.

6. Apparatus of the character described for trimming tubular pieces comprising a die having a through bore for receiving successive said pieces therein for trimming, a punch supported at the front end of said die for insertion in the end of each said piece to be trimmed, a feed rod mounted for reciprocating movement at the back of said die to feed said successive pieces into said bore, a first fluid pressure cylinder for reciprocating said feed rod, means establishing an advanced limit position for said feed rod, an ejector rod adapted to extend through said punch into each said piece, a second fluid pressure cylinder for urging said ejector rod toward said feed rod, said second cylinder being of less effective area than said first cylinder to cause said ejector rod and said feed rod to hold said piece in fixed relation with said feed rod and said die during application of pressure fluid to both said cylinders, drive means for effecting relative transverse movement of said punch and said die to trim said piece during said application of pressure fluid to both said cylinders, and means for releasing said first cylinder while continuing application of pressure to said second cylinder to cause simultaneous retraction of said feed rod and advance of said ejector rod for ejection of the trimmed piece from said die.

7. Apparatus of the character described for trimming tubular pieces comprising a die having a through bore for receiving successive said pieces therein for trimming, a punch supported at the front end of said die for insertion in the end of each said piece to be trimmed, a feeding member mounted for reciprocating movement at the back of said die to feed said successive pieces into said bore, means establishing an advanced limit position for said feeding member, an ejector rod adapted to extend through said punch into each said piece, means urging said ejector rod toward said feeding member to hold said piece in fixed relation with said feeding member and said die, drive means for effecting relative transverse movement of said punch and said die to trim said piece, means forming a transversely movable pressure connection between said urging means and said ejector rod providing for transverse movement of said ejector rod with said punch while maintaining the holding action thereof with said feeding member, and means for retracting said feeding member while continuing operation of said urging means to cause said ejector rod to eject the trimmed piece from said die.

8. Apparatus of the character described for simultaneously trimming a plurality of tubular pieces comprising a die having a plurality of through bores for receiving said pieces therein for trimming, feeding means mounted for reciprocating movement at the back of said die to feed successive said pieces into said bores, means for periodically holding said feeing means stationary in the advanced limit position thereof, a plurality of punches located at the front end of said die for insertion in the ends of said pieces to be trimmed, a plurality of pusher members for engaging the opposite sides of said pieces from said feeding means, drive means for effecting relative transverse movement of said punches and said die to trim said pieces, means for applying yielding pressure to said pusher members during operation of said drive means to maintain said pieces held against said feeding means in fixed relation with said die during trimming thereof, and means operable following said trimming movement for retracting said feeding means while continuing said application of pressure to said pusher members to eject the trimmed pieces from said die.

9. Apparatus of the character described for simultaneously trimming a plurality of tubular pieces comprising a die having a plurality of through bores for receiving said pieces therein for trimming, a plurality of feed rods mounted for reciprocating movement at the back of said die to feed successive said pieces into said bores, means establishing an advanced limit position for said feed rod, a plurality of ejector rods each adapted to extend through one said punch into one of said bores, fluid pressure means urging said ejector rods towards said feed rods to hold said pieces in fixed relation with said feed rods and said die, drive means for effecting relative transverse movement of said punches and said die to trim said pieces, and means for retracting said feed rods while continuing operation of said fluid pressure means to cause said ejector rods to advance said operation of said fluid pressure means and to eject the trimmed pieces from said die.

10. Apparatus of the character described for simultaneously trimming a plurality of tubular pieces comprising a die having a plurality of through bores for receiving said pieces therein for trimming, a plurality of punches supported at the front end of said die for insertion in the ends of said pieces to be trimmed, feeding means mounted for reciprocating movement at the back of said die to feed successive said pieces into said bores, a first fluid pressure cylinder for reciprocating said feeding means, means establishing an advanced limit position for said feeding means, a plurality of ejector rods each adapted to extend through one said punch into one of said bores, a second fluid pressure cylinder for urging said ejector rods toward said feeding means, said second cylinder being of less effective area than said first cylinder to cause said ejector rods and said feeding means to hold said pieces in fixed relation with said feeding means and said die during application of pressure fluid to both said cylinders, drive means for effecting relative transverse movement of said punches and said die to trim said pieces during said application of pressure fluid to both said cylinders, and means for releasing said first cylinder while continuing application of pressure to said second cylinder to cause simultaneous retraction of said feeding means and advance of said ejector rods for ejection of the trimmed pieces from said die.

11. Apparatus of the character described for simultaneously trimming a plurality of tubular pieces comprising a die having a plurality of through bores for receiving said pieces therein for trimming, a plurality of feed rods mounted for reciprocating movement at the back of said die to feed successive said pieces into said bores, means establishing an advanced limit position for said feed rod, a plurality of ejector rods each adapted to extend through one said punch into one of said bores, means urging said ejector rods towards said feed rods to hold said pieces in fixed relation with said feed rods and said die, drive means for effecting transverse movement of said punches to trim said pieces, means forming a transversely movable pressure connection between said urging means and said ejector rods providing for transverse movement of said ejector rods with said punches while maintaining the holding action thereof with said feed rods, and means for retracting said feed rods while continuing operation of said urging means to cause said ejector rods to eject the trimmed pieces from said die.

12. Apparatus of the character described for trimming tubular pieces comprising a frame, a die fixed in said frame and having a through bore for receiving successive said pieces therein for trimming, a punch adapted for insertion in the end of each said piece to be trimmed, a cam block supporting said punch at the front end of said die, means supporting said cam block for transverse movement in said frame with respect to said die, means urging said cam block towards said die to maintain said punch in predetermined relation with said die, a ram reciprocable axially in said frame with respect to said die, drive means for reciprocating said ram, cams on said ram for effecting and guiding said movement of said cam block in response to said axial movement of said ram to cause said punch to move transversely with respect to said die to trim said piece, and means continuously effective during said movement of said ram for maintaining said piece in predetermined axial relation with said die to establish the portion of said piece trimmed therefrom during said movement of said punch.

13. Apparatus of the character described for trimming tubular pieces comprising a frame, a die fixed in said frame and having a generally horizontal through bore for receiving successive said pieces therein for trimming, a punch adapted for insertion in the end of each said piece to be trimmed, a cam block supporting said punch at the front end of said die, means supporting said cam block for transverse movement in said frame with respect to said die, a feeding member mounted for reciprocating movement at the back of said die to feed said successive pieces into said bore, a ram reciprocable horizontally in said frame with respect to said die, drive means for reciprocating said ram, cams on said ram for effecting and guiding said transverse movement of said cam block in response to said horizontal movement of said ram to cause said punch to move transversely with respect to said die to trim said piece, means for yieldably urging each said piece against said feeding member during said movement of said punch to maintain the position of said piece in said die, and means for retracting said feeding member following said movement of said punch while continuing the operation of said urging means to eject the trimmed pieces from said die.

14. Apparatus of the character described for trimming tubular pieces comprising a frame, a die in said frame having a substantially horizontal through bore for receiving successive said pieces therein for trimming, a generally vertically arranged chute for supplying said successive pieces to said die, a feed rod mounted for reciprocating movement through said chute to feed said successive pieces into said bore, tray means mounted for reciprocating movement below said feed rod for receiving the trimmed pieces from said die, means for reciprocating said feed rod and said tray means simultaneously in opposite directions to advance said tray means as said feed rod retracts and vice versa, means for ejecting the trimmed pieces from said die as said feed rod retracts to deposit said trimmed pieces successively on said tray means, said tray means being spaced below said bore by a distance substantially equal to the diameter of each said piece to cause the trimmed piece deposited thereon to receive thereon by gravity and support the next said piece to be trimmed in aligned relation with said bore for feeding thereinto upon the advance of said feed rod, and means responsive to retraction of said tray means for dislodging said trimmed piece therefrom.

15. Apparatus of the character described for simultaneously trimming a plurality of tubular pieces comprising a frame, a die in said frame having a plurality of substantially horizontal through bores for receiving said pieces therein for trimming, a hopper for supplying successive said pieces to said die, means forming a plurality of generally vertical chutes each connecting said hopper with one said bore and adapted to support therein a vertical stack of said pieces, a plurality of feed rods each mounted for reciprocating movement through one said chute to feed successive said pieces into one of said bores, tray means mounted for reciprocating movement below said feed rods for receiving the trimmed pieces from said die, means for reciprocating said feed rods and said tray means simultaneously in opposite directions to advance said tray means as said feed rods retract and vice versa, means for ejecting the trimmed pieces from said die as said feed rods retract to deposit said trimmed pieces on said tray means, said tray means including a portion spaced below each said bore by a distance substantially equal to the diameter of each said piece to cause the trimmed pieces deposited thereon to receive by gravity and support the next said pieces to be trimmed in aligned relation with said bores, and means responsive to retraction of said tray means for dislodging said trimmed pieces therefrom.

16. Apparatus of the character described for trimming tubular pieces comprising a die having a substantially horizontal through bore for receiving successive said pieces therein for trimming, a generally vertically arranged chute for supplying a plurality of successive said pieces to said die, a punch supported at the front end of said die for insertion in the end of each piece to be trimmed, a feed rod mounted for reciprocating movement through said chute to feed said successive pieces into said bore, tray means mounted for reciprocating movement below said feed rod for receiving the trimmed pieces from said die, means for reciprocating said feed rod and said tray means simultaneously in opposite directions to advance said tray means as said feed rod retracts and vice versa, an ejector rod adapted to extend through said punch into each said piece, means for urging said ejector rod towards said feed rod to hold said piece with said feed rod in the advanced position of said feed rod, means operable during said holding action of said rods for causing transverse movement of said punch to trim said piece, means for continuing the operation of said urging means as said feed rod retracts to cause said ejector rod to eject the trimmed piece on to said tray means, said tray means being spaced below said bore by a distance substantially equal to the diameter of each said piece to cause the trimmed piece thereon to receive by gravity thereon and support the next said piece to be trimmed in aligned relation with said bore for feeding thereinto upon the advance of said feed rod, and means responsive to retraction of said tray means for dislodging said trimmed piece therefrom.

References Cited in the file of this patent

UNITED STATES PATENTS

| | | |
|---|---|---|
| 1,577,644 | Juenst | Mar. 23, 1926 |
| 1,925,884 | Steel | Sept. 5, 1933 |
| 2,320,272 | Friden | May 25, 1943 |
| 2,404,901 | Cibs | July 30, 1946 |
| 2,620,031 | Swift | Dec. 5, 1952 |
| 2,627,921 | Brehm | Feb. 10, 1953 |
| 2,669,302 | Brehm | Feb. 16, 1954 |